(No Model.)
C. CASTOR.
COMBINED SPIRIT LEVEL AND GRADING INSTRUMENT.
No. 601,629. Patented Apr. 5, 1898.
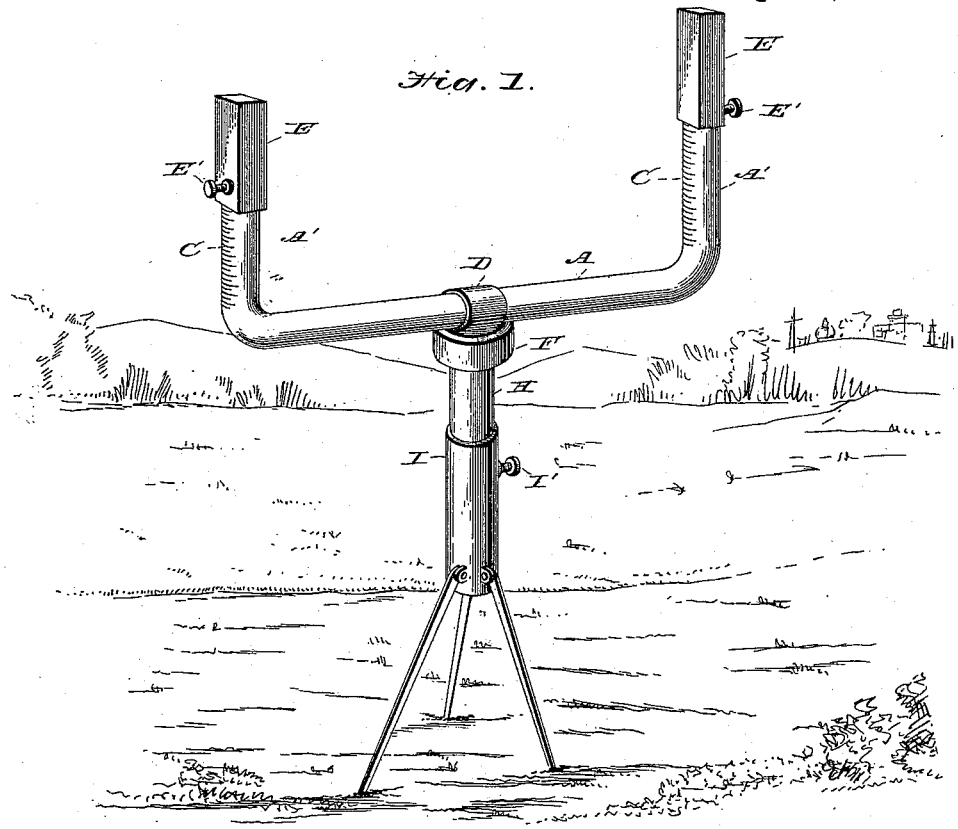
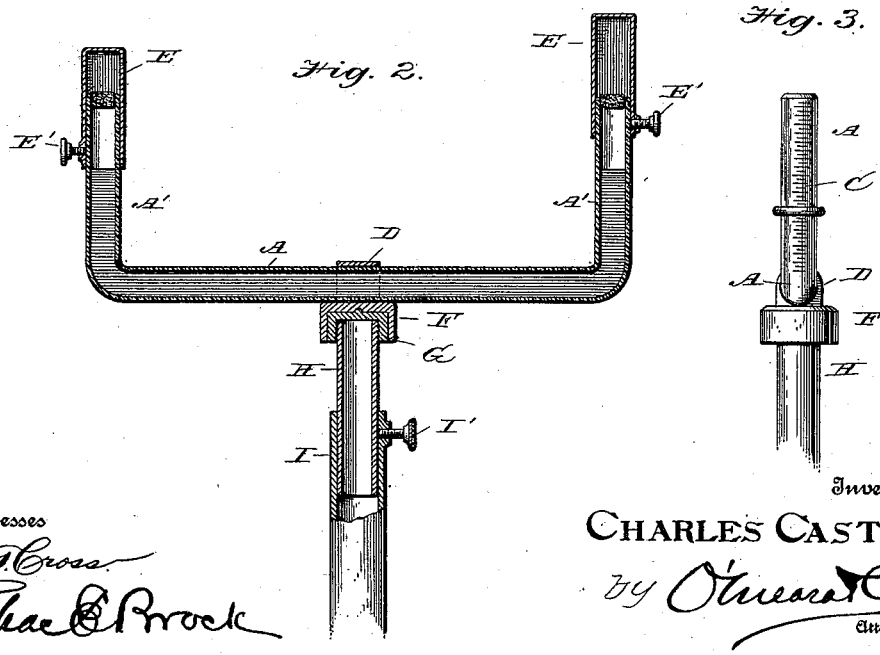
Witnesses
J. T. Cross
Chas. C. Brock
Inventor
CHARLES CASTOR,
by O'Meara & Co
Attorneys

UNITED STATES PATENT OFFICE.

CHARLES CASTOR, OF PRINCETON, KENTUCKY.

COMBINED SPIRIT-LEVEL AND GRADING INSTRUMENT.

SPECIFICATION forming part of Letters Patent No. 601,629, dated April 5, 1898.

Application filed June 24, 1897. Serial No. 642,169. (No model.)

*To all whom it may concern:*

Be it known that I, CHARLES CASTOR, residing at Princeton, in the county of Caldwell and State of Kentucky, have invented a new and useful Combined Spirit-Level and Grading Instrument, of which the following is a specification.

My invention relates to a spirit-level by which the entire foundation of a building can be leveled from a single point and which can also be used for grading purposes.

The object of my invention is to provide a simple arrangement of such a device which will readily and quickly perform the work for which it is adapted, thereby saving a great deal of the time and labor now expended with the instruments ordinarily used. I accomplish this object by mounting the level on a turn-table supported on a tripod and provide suitable means in connection with the level for indicating the grade or level.

My invention consists in the improved construction, arrangement, and combination of parts hereinafter fully described, and afterward specifically pointed out in the claims.

In order to enable others skilled in the art to which my invention most nearly appertains to make and use the same, I will now proceed to describe its construction and operation, having reference to the accompanying drawings, forming part of this specification, in which—

Figure 1 is a perspective view of my improved instrument set up for operation. Fig. 2 is a vertical longitudinal section of the level, and Fig. 3 is a detail end elevation of the level in a slightly-modified form.

In the said drawings, A represents a glass tube of any desired length, having the upturned ends A'. The tube A is adapted to contain a colored liquid, which fills the tube and its upturned ends A' for about one-half of their height. The upturned ends A' of the tube A have upon them the graduated scales C, and at each end are the square caps E, provided with the set-screws E', by which they are secured at any desired height thereon.

To permit of the level being turned, I mount the tube A in a loop D, formed upon a cap F, which is mounted to turn after the manner of a turn-table on a cap G, threaded on a tube H, sliding in the cylinder I of the tripod. The tube H is held at any desired height in the cylinder I by means of a set-screw I'.

As is well known, liquids will always seek a level, and when this instrument is set up the top line of the liquid in the tubes will always be on a true horizontal plane. Having fixed the level, any desired variation therefrom may be indicated upon the graduated scales by raising and lowering the caps E.

To practically operate the invention, the tripod is placed in position and adjusted until the liquid is at the same height in both tubes. One cap is then fixed at the liquid-level and the other adjusted up or down on the tube, and by sighting by them in such positions the grade of a road or field can be fixed or can be easily ascertained.

To level up a foundation or piece of ground, the operator may place the instrument at one corner of a foundation or lot to be leveled, when the caps are both adjusted to the liquid-level and sighted, as before stated, it being possible to level the whole foundation or lot without changing its position. An ordinary surveyor's rod may be used in these operations, and by its use, in connection with my instrument, all lengthy mathematical calculations are dispensed with.

While I have illustrated and described the best means now known to me for carrying out my invention, I wish it to be understood that I do not restrict myself to the exact details of construction shown, but hold that any slight changes or variations such as might suggest themselves to the ordinary mechanic would clearly fall within the limit and scope of my invention.

In the modification shown in Fig. 3 the caps are dispensed with and a movable ring placed on the upturned ends A' of the tube A.

Having thus fully described my invention, what I claim as new, and desire to secure by Letters Patent, is—

1. In an instrument for leveling and grading, the combination of the tripod-cylinder, the tube adjustably held therein, and a level mounted to turn on said tube, said level consisting of a glass tube with the upturned ends having graduated scales thereon, and an adjustable cap on each upturned end, substantially as shown and described.

2. In a level, the combination of the tripod-cylinder, a level mounted thereon so that it can be turned, said level consisting of a glass tube having the upturned ends with graduated scales, and an adjustable cap on each upturned end of the glass tube, and means for securing said caps at any desired adjustment, substantially as described.

CHARLES CASTOR.

Witnesses:
EDWARD GARRETT,
R. M. POOL.